United States Patent
Zhang (10) Patent No.: US 9,258,247 B2
(45) Date of Patent: Feb. 9, 2016

(54) METHOD AND APPARATUS FOR LOAD SHARING

(71) Applicant: Huawei Technologies Co., LTD., Shenzhen (CN)

(72) Inventor: Yongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 14/018,158

(22) Filed: Sep. 4, 2013

(65) Prior Publication Data

US 2014/0013005 A1  Jan. 9, 2014

Related U.S. Application Data

(63) Continuation of application No. PCT/CN2012/072662, filed on Mar. 21, 2012.

(30) Foreign Application Priority Data

Mar. 21, 2011 (CN) .......................... 2011 1 0067988

(51) Int. Cl.
*H04L 12/863* (2013.01)
*H04L 12/803* (2013.01)
*H04L 12/873* (2013.01)

(52) U.S. Cl.
CPC ............ *H04L 47/623* (2013.01); *H04L 47/125* (2013.01); *H04L 47/52* (2013.01); *H04L 47/522* (2013.01); *H04L 47/6215* (2013.01)

(58) Field of Classification Search
CPC ... H04L 41/0896; H04L 45/125; H04L 45/24; H04L 47/125; H04L 47/52; H04L 47/6255; H04L 45/00; H04W 28/0289; H04W 28/08; H04W 88/06
USPC ......... 709/240, 238, 239, 241–244, 232, 233, 709/235
See application file for complete search history.

(56) References Cited

U.S. PATENT DOCUMENTS

| | | | |
|---|---|---|---|
| 6,470,016 B1 | 10/2002 | Kalkunte et al. | |
| 8,014,278 B1* | 9/2011 | Subramanian et al. | 370/229 |
| 2003/0081549 A1 | 5/2003 | Goetzinger et al. | |
| 2004/0264374 A1* | 12/2004 | Yu et al. | 370/230 |
| 2008/0175269 A1* | 7/2008 | Alvarez et al. | 370/468 |
| 2009/0190474 A1* | 7/2009 | Gahm et al. | 370/235 |
| 2012/0008503 A1 | 1/2012 | Qiu et al. | |
| 2012/0207175 A1* | 8/2012 | Raman et al. | 370/412 |
| 2012/0218898 A1* | 8/2012 | Cai et al. | 370/237 |

FOREIGN PATENT DOCUMENTS

| | | |
|---|---|---|
| CN | 1859276 A | 11/2006 |
| CN | 101022413 A | 8/2007 |
| CN | 101184049 A | 5/2008 |
| CN | 101227402 A | 7/2008 |

(Continued)

*Primary Examiner* — Ruolei Zong
(74) *Attorney, Agent, or Firm* — Brinks Gilson & Lione (57) ABSTRACT

A load sharing method comprises: receiving a message and determining an outbound interface that is configured to forward the message; obtaining bandwidth usage parameters of the outbound interfaces when a number of the outbound interfaces is greater than 1; selecting one of the outbound interfaces as a forwarding outbound interface for forwarding the message, according to the bandwidth usage parameters of the outbound interfaces and a content of the message.

11 Claims, 7 Drawing Sheets

(56) References Cited

FOREIGN PATENT DOCUMENTS

| CN | 101583057 A | 11/2009 |
| CN | 101729425 A | 6/2010 |
| CN | 101753451 A | 6/2010 |
| CN | 102137018 A | 7/2011 |
| EP | 2180644 A1 | 4/2010 |

* cited by examiner

Fig.5

METHOD AND APPARATUS FOR LOAD SHARING

CROSS-REFERENCE TO RELATED APPLICATIONS

This application is a continuation of International Application No. PCT/CN2012/072662, filed on Mar. 21, 2012, which claims priority to Chinese Patent Application No. 201110067988.X, filed on Mar. 21, 2011, both of which are hereby incorporated by reference in their entireties.

FIELD

The present disclosure relates to communication technology field, particularly, to a method and an apparatus for load sharing.

BACKGROUND

With the step-by-step capacity expansion of Internet Protocol (IP) service forwarding, a forwarding algorithm for traffic load sharing is becoming more and more important, and directly determines whether network resources can be automatically allocated and employed.

In conventional technology, two load sharing methods are used, including a method for load sharing per stream and a method for load sharing per packet. However, in the conventional load sharing methods, the sharing method and the proportion of the traffic are determined at an inbound interface. In this case, even when an outbound interface for load sharing is congested, the inbound interface would still send the traffic to the outbound interface according to a fixed sharing proportion, which results in traffic congesting and packet loss at the outbound interface.

SUMMARY

Embodiments of the present disclosure provide a method and an apparatus for load sharing, to improve user experience in using a network.

In an aspect, the present disclosure provides a load sharing method implemented in a network device having a processor. The method includes: receiving a message and determining an outbound interface(s) that can be used to forward the message; obtaining bandwidth usage parameters of the outbound interfaces when the number of the outbound interfaces is greater than 1; selecting one of the outbound interfaces as a forwarding outbound interface to forward the message, according to the bandwidth usage parameters of the outbound interfaces and a content of the message.

In another aspect, the disclosure provides a load sharing apparatus such as a network device comprising: a message receiving unit, configured to receive a message and determine an outbound interface(s) that can be used to forward the message; a parameter obtaining unit, configured to obtain bandwidth usage parameters of the outbound interfaces when the number of the outbound interfaces is greater than 1; an interface selecting unit, configured to select one of the outbound interfaces as a forwarding outbound interface to forward the message, according to the bandwidth usage parameters of the outbound interfaces and a content of the message.

In accordance with the method and the apparatus for load sharing of embodiments of the present disclosure, when forwarding the received message, one of the outbound interfaces is selected as a forwarding outbound interface to forward the message, according to the bandwidth usage parameters of the outbound interfaces for forwarding the message as well as the bandwidth usage parameters of the outbound interfaces and the content of the message. That is to say, the bandwidth usage conditions of the outbound interfaces for forwarding the message are fully considered, thereby avoiding traffic congestion and packet loss during forwarding a message, decreasing message traffic loss, and improving the user experience in using the network.

BRIEF DESCRIPTION OF DRAWINGS

In order to clearly illustrate the solutions of the embodiments of the present disclosure, drawings used for the description of the embodiments will be briefly described in the following. It is obvious that the drawings are only related to some embodiments of the present disclosure and those skilled in the art can get other drawings from these drawings without any inventive work.

DESCRIPTION OF EMBODIMENTS

The solutions of the embodiments of the present disclosure will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiments which should be within the scope of the present disclosure, without any inventive work.

Figure 1:
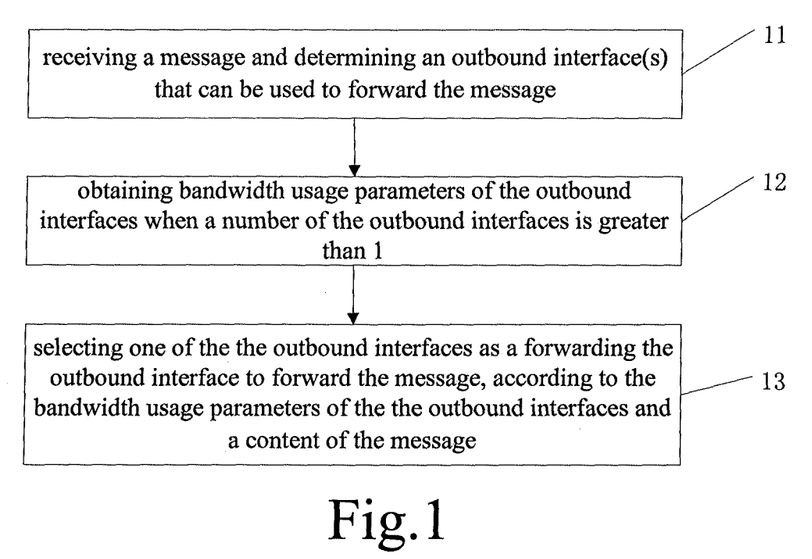
FIG. 1 illustrates a flow chart of a load sharing method in accordance with a first embodiment of the present disclosure.

As illustrated in FIG. 1, a first embodiment of the present disclosure provides a load sharing method, comprising:

11, receiving a message and determining an outbound interface(s) that can be used to forward the message.

Optionally, in an embodiment of the present disclosure, a forwarding information table (full name in English: Forwarding Information Table, abbreviated as FIB) or a routing forwarding table is looked up in according to a destination address of the message, after receiving a message; and an outbound interface(s) for forwarding the message, that is, a next hop corresponding to the destination address of the message, may be determined. Here the destination address of the message includes a destination IP address of the message.

12, obtaining bandwidth usage parameters of the outbound interfaces when the number of the outbound interfaces is greater than 1;

In an embodiment of the present disclosure, the bandwidth usage parameters include remaining bandwidths of the outbound interfaces. Optionally, the bandwidth usage parameters may further include remaining bandwidths of each of priority queues of the outbound interfaces, and so on.

As an example, it is assumed that there are two outbound interfaces, that is, outbound interface A and outbound interface B, for forwarding the message, and the bandwidth of outbound interface A is 1 Gbps, the used bandwidth of outbound interface A at a moment is 500 Mbps, then the remaining bandwidth of outbound interface A is 1 Gbps−500 Mbps=500 Mbps. The bandwidth of outbound interface B is 1 Gbp, at the same moment, the used bandwidth of outbound interface B is 600 Mbps, then the remaining bandwidth of outbound interface B is 1 Gbps−600 Mbps=400 Mbps.

Optionally, in an embodiment of the present disclosure, a timer may be set and the bandwidth usage parameters of the outbound interface(s) are monitored and acquired periodically.

13, selecting one of the outbound interfaces as a forwarding outbound interface to forward the message, according to the bandwidth usage parameters of the outbound interfaces and a content of the message.

Optionally, load sharing weights of the outbound interfaces are determined based on the remaining bandwidths of the outbound interfaces, then one of the outbound interfaces is selected as the forwarding outbound interface to forward the message, according to the load sharing weights and the content of the message (such as a 5-tuple, etc.). The forwarding outbound interface is an outbound interface eventually used for forwarding the message. For example, an outbound interface with a larger load sharing weight may be preferably selected as the forwarding outbound interface to forward the message.

Still taking the outbound interfaces A and B as the example, according to the remaining bandwidths of the outbound interfaces A and B at the moment, it is determined that outbound interface A can forward 500 Mbps (which is its remaining bandwidth) of message traffic and outbound interface B can forward 400 Mbps (which is its remaining bandwidth) of message traffic. Therefore, the load sharing weight of outbound interface A is 5/9 and the load sharing weight of outbound interface B is 4/9.

Optionally, to fully utilize the network bandwidth, message traffic information forwarded each time by an outbound interface may be recorded after selecting one outbound interface as the forwarding outbound interface for forwarding the message. In this case, when determining the load sharing weights of the outbound interfaces, the traffic information of a previous message forwarded by the outbound interface may be further considered.

For example, it is assumed that, at the present moment, the remaining bandwidth of outbound interface A is 500 Mbps and the remaining bandwidth of outbound interface B is 500 Mbps. Based on the record, a previous (a previous moment) traffic forwarded by outbound interface A is 100 Mbps and a previous (the previous moment) traffic forwarded by outbound interface B is 200 Mbps. Since the outbound interfaces A and B are constantly forwarding messages, it may be supposed that at the current moment the traffic at the previous moment has been sent out and the bandwidth taken up by the traffic at the previous moment has been released. Therefore, it may be determined that the traffic forwardable by outbound interface A at the moment is 500 Mbps+100 Mbps=600 Mbps and that of outbound interface B is 500 Mbps+200 Mbps=700 Mbps. In this case, the load sharing weight of outbound interface A is 6/13 and that of outbound interface B is 7/13.

It can be seen from the above description that, in the load sharing method of the embodiment of the present disclosure, the bandwidth usage of each of the outbound interfaces for forwarding the message is fully considered, as a result, traffic congestion and packet loss during forwarding the message can be avoided and message traffic loss can be decreased, thereby improving the user experience in using the network.

Figure 2:
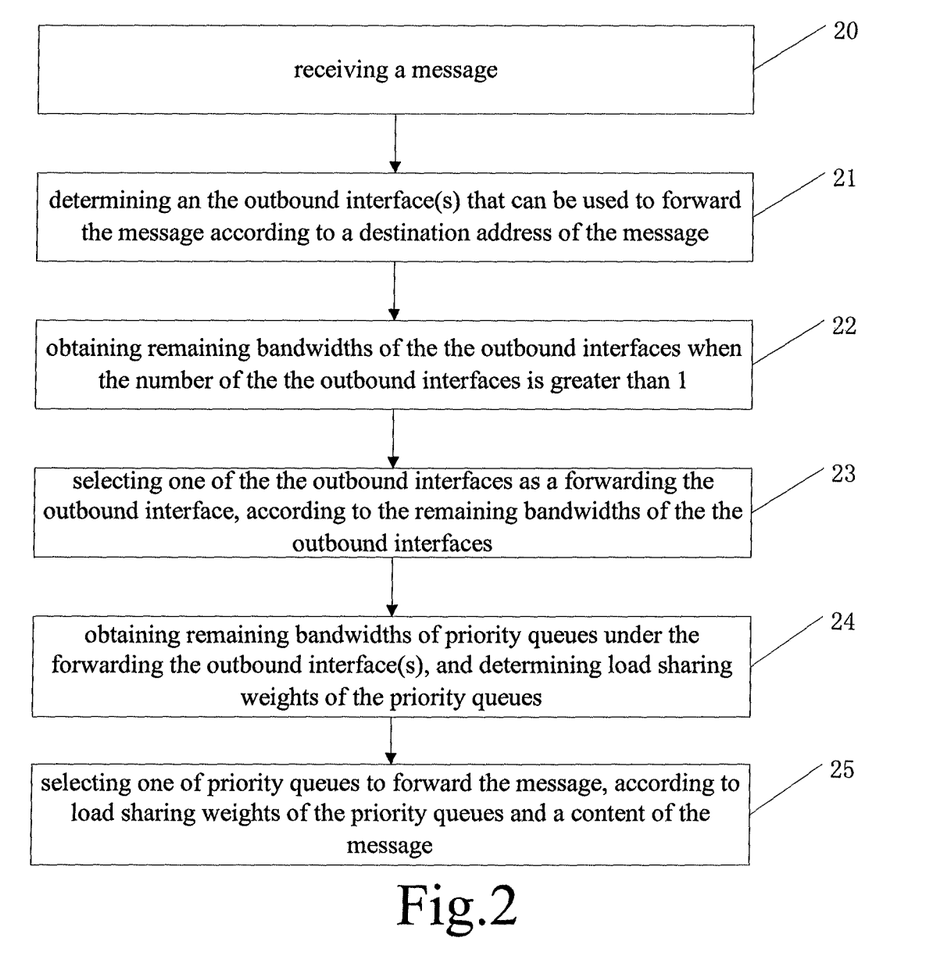
FIG. 2 illustrates a flow chart of a load sharing method in accordance with a second embodiment of the present disclosure.

As illustrated in FIG. 2, a load sharing method in accordance with a second embodiment of the present disclosure comprises:

20, receiving a message.

21, determining an outbound interface(s) that can be used for forwarding the message according to a destination address of the message.

In the embodiment, a FIB or a routing forwarding table may be looked up in according to the destination address (such as a destination IP address) of the message, to determine an outbound interface(s) that can be used for forwarding the message, that is, a next hop corresponding to a destination address of the message, may be determined. Here it is assumed that outbound interfaces capable of forwarding the message are outbound interface A and outbound interface B.

22, obtaining remaining bandwidths of the outbound interfaces when the number of the outbound interfaces is greater than 1.

23, selecting one of the outbound interfaces as a forwarding outbound interface according to the remaining bandwidths of the outbound interfaces.

Here, the "selecting one of the outbound interfaces as the forwarding outbound interface according to the remaining bandwidths of the outbound interfaces" may refer to the procedures described in embodiment 1.

24, obtaining remaining bandwidths of priority queues of the forwarding outbound interfaces and determining load sharing weights of the priority queues.

Taking outbound interface A as an example, it is assumed that the physical bandwidth of outbound interface A is 1 Gbps, and bandwidths of 8 priority queues of which are respectively:

BE: 100 Mbps; AF1: 100 Mbps; AF2: 200 Mbps; AF3: 200 Mbps; AF4: 100 Mbps; EF: 100 Mbps; CS6: 100 Mbps; CS7: 100 Mbps.

At a certain moment, bandwidths used by the 8 priority queues of outbound interface A are respectively:

BE: 50 Mbps; AF1: 60 Mbps; AF2: 100 Mbps; AF3: 120 Mbps; AF4: 50 Mbps; EF: 70 Mbps; CS6: 20 Mbps; CS7: 30 Mbps.

Therefore, at this moment, the remaining bandwidths of the 8 priority queues of outbound interface A are respectively:

BE: 50 Mbps; AF1: 40 Mbps; AF2: 100 Mbps; AF3: 80 Mbps; AF4: 50 Mbps; EF: 30 Mbps; CS6: 80 Mbps; CS7: 70 Mbps.

Optionally, when the number of the outbound interfaces is equal to 1, the procedure may jump to 24 directly after 22.

25, selecting one of the priority queues to forward the message, according to the load sharing weights of the priority queues and a content of the message (such as a 5-stuple, etc.).

Optionally, to fully utilize the network bandwidth, message traffic information forwarded each time by a priority queue may be recorded after selecting the priority queue to forward the message. In this case, when determining the load sharing weights of the priority queues, traffic information of a previous message forwarded by the priority queues may be further considered.

It can be seen from the above description that, in accordance with the method of embodiment 2 of the present disclosure, the load sharing may be performed on the priority queues of the outbound interface. Therefore, when the method in accordance with embodiment 2 of the present disclosure is used for load sharing, a control accuracy and a user experience can be improved.

Figure 3A:
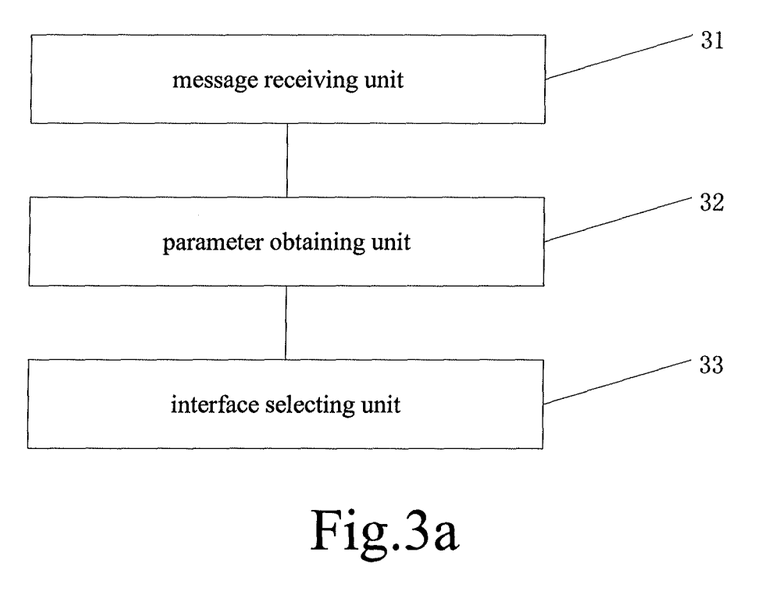
FIG. 3a to FIG. 3d schematically illustrate some configurations of load sharing apparatuses in accordance to a third embodiment of the present disclosure.

As illustrated in FIG. 3a, a load sharing apparatus in accordance with embodiment 3 of the present disclosure comprises:

a message receiving unit 31 configured to receive a message and determine an outbound interface(s) that can be used to forward the message;

a parameter obtaining unit 32 configured to obtain bandwidth usage parameters of the outbound interfaces when the number of the outbound interfaces is greater than 1;

an interface selecting unit 33 configured to select one of the outbound interfaces as a forwarding outbound interface to forward the message, according to the bandwidth usage parameters of the outbound interfaces and a content of the message.

It can be seen from the above description that, in the load sharing apparatus of embodiment 3 of the present disclosure, the bandwidth usage of each of the outbound interfaces for forwarding the message is fully considered, as a result, traffic congestion and packet loss during forwarding the message can be avoided and message traffic loss can be decreased, thereby improving the user experience in using the network.

Figure 3B:
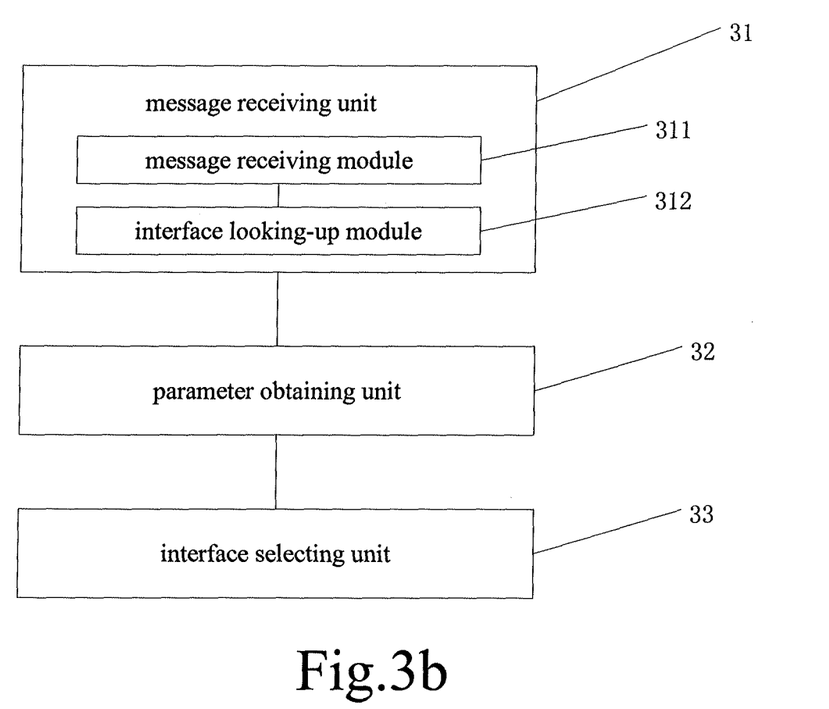

Optionally, as illustrated in FIG. 3b, the message receiving unit 31 may comprises:

a message receiving module 311 configured to receive a message; and an interface looking-up module 312 configured to look up in a forwarding information base or in a routing forwarding table according to a destination address of the message, to obtain the outbound interfaces that can be used to forward the message.

Figure 3C:
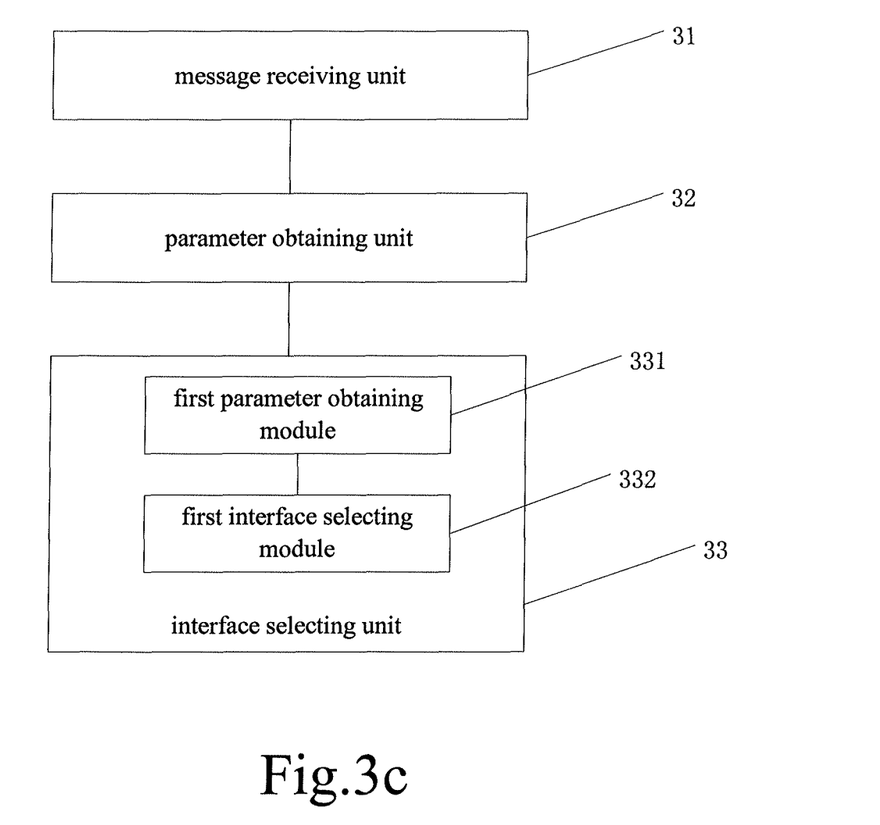

Optionally, as illustrated in FIG. 3c, the interface selecting unit 33 may comprises:

a first parameter obtaining module 331 configured to obtain load sharing weights of the outbound interface(s) according to remaining bandwidths of the outbound interface(s); and a first interface selecting module 332 configured to select one of the outbound interface as the forwarding outbound interface to forward the message, according to the load sharing weights of the outbound interfaces and a content of the message.

Figure 3D:
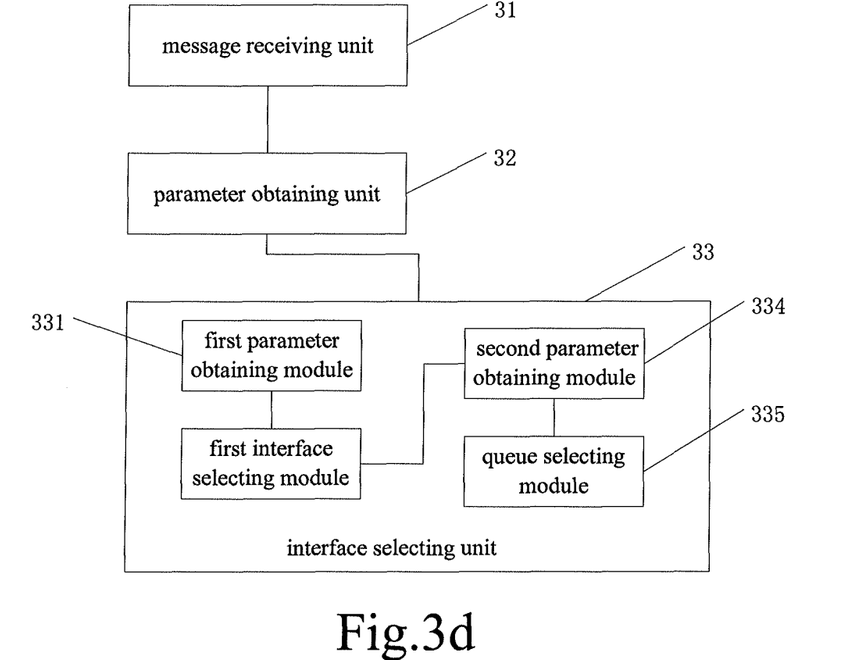

Optionally, as illustrated in FIG. 3d, the interface selecting unit 33 may further comprises:

a second parameter obtaining module 334 configured to obtain load sharing weights of priority queues of the forwarding outbound interface, according to remaining bandwidths of the priority queues of the forwarding outbound interface; and a queue selecting module 335 configured to select one of the priority queues of the forwarding outbound interface to forward the message, according to the load sharing weights of the priority queues of the forwarding outbound interface and a content of the message.

Figure 4:
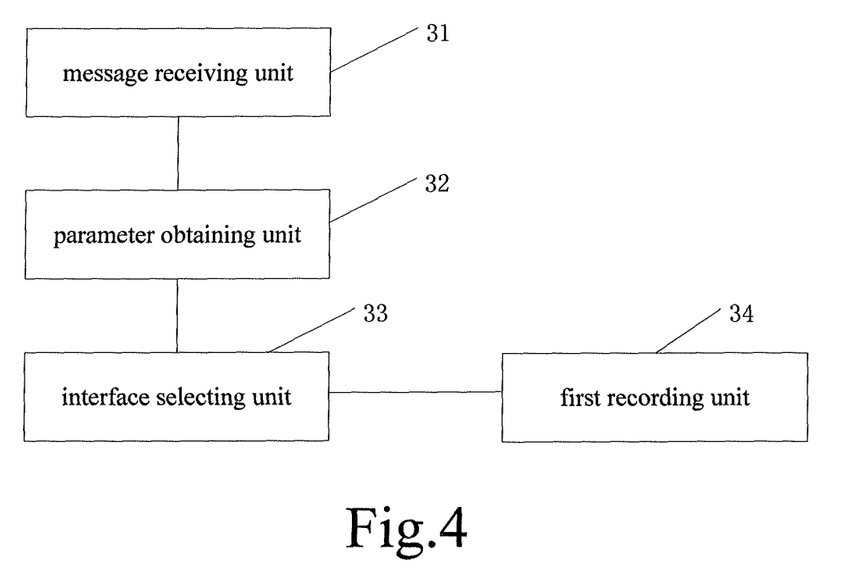
FIG. 4 illustrate another configuration of a load sharing apparatus in accordance with a third embodiment of the present disclosure.

Optionally, as illustrated in FIG. 4, for the purpose of improving message forwarding efficiency, the apparatus may further comprise: a first recording unit 34 configured to record traffic information forwarded by the outbound interface.

Accordingly, the first parameter obtaining module 331 is configured to obtain load sharing weights of the outbound interfaces, according to the remaining bandwidths of the outbound interfaces and the traffic information previous forwarded by the outbound interfaces, which is recorded by the first recording unit 34.

Optionally, in the embodiment, the bandwidth usage parameters include the remaining bandwidths of the outbound interface(s). Furthermore, the bandwidth usage parameters may further include the remaining bandwidths of each of the priority queues of the outbound interface(s), and so on.

Figure 5:
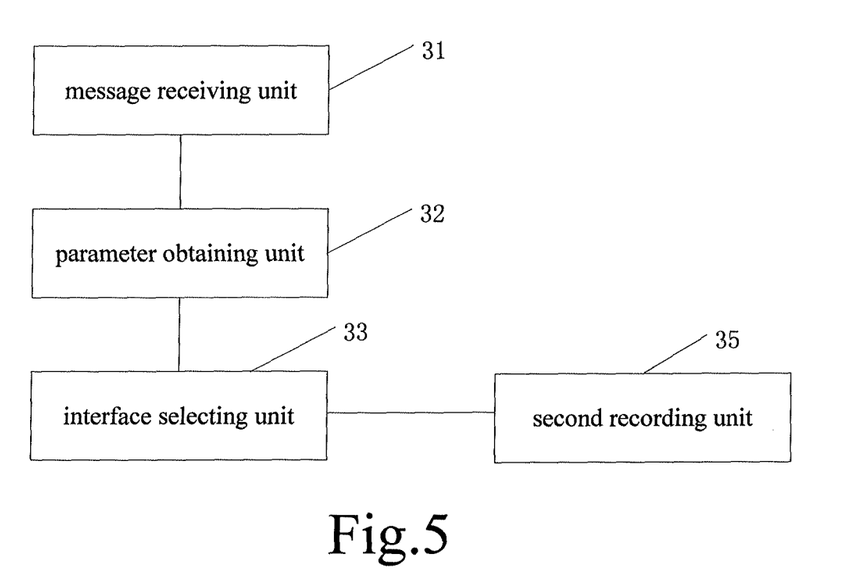
FIG. 5 illustrates still another configuration of a load sharing apparatus in accordance with a third embodiment of the present disclosure.

Optionally, as illustrated in FIG. 5, the apparatus may further comprise: a second recording unit 34 configured to record traffic information of the message forwarded by the priority queue(s) of the outbound interface(s).

To further save the bandwidth, the second parameter obtaining module 334 may be further configured to obtain the load sharing weights of the priority queue(s) of the forwarding outbound interface, according to the remaining bandwidths of the priority queue(s) of the forwarding outbound interface and the traffic information, recorded by the second recording unit 35, of the previous message forwarded by the priority queues of the forwarding outbound interface.

About the operating principle of the apparatus, you may refer to that of the method embodiments as stated above.

In summary, by using the methods and the apparatuses of the embodiments of the present disclosure, traffic loss of the message can be reduced and user experience can be improved.

It can be understood by those skill in the art that a part or all of the flow in the method embodiments may be implemented by a computer program giving instructions to related hardware such as a network device having a hardware processor. The computer program may be stored on a computer readable storage medium and may be executed to perform the flow of each of method embodiments described above. Here the storage medium may be a magnetic disk, an optical disk, a read only memory (Full name in English: Read Only Memory, abbreviated as ROM) or a random access memory (Full name in English: Random Access Memory, abbreviated as RAM), etc.

What are described above is merely specific embodiments of the present disclosure and not limitative to the protection scope of the present disclosure. Those skilled in the art can conceive various modifications and equivalents according to the teachings of the disclosure which is within the protection scope of the present disclosure. Therefore, the protection scope of the present disclosure should be interpreted by the accompanying claims.

What is claimed is:

1. A load sharing method implemented in a network device having a processor, comprising:

receiving, by the network device, a message and determining at least one outbound interface that is configured to forward the message;

obtaining, by the network device, bandwidth usage parameters of the determined outbound interfaces when a number of the outbound interfaces is greater than one; wherein the bandwidth usage parameters comprise remaining bandwidths of the determined outbound interfaces and remaining bandwidths of priority queues of the determined outbound interfaces;

when the number of the determined outbound interfaces is greater than one, selecting, by the network device, one of the determined outbound interfaces as a forwarding outbound interface to forward the message, according to the remaining bandwidths of the determined outbound interfaces and a content of the message;

obtaining load sharing weights of the priority queues of the forwarding outbound interface according to the remaining bandwidths of the priority queues of the forwarding outbound interface; and selecting one of the priority queues of the forwarding outbound interface to forward the message, according to the load sharing weights of the priority queues and the content of the message.

2. The method of claim 1, wherein the determining the at least one outbound interface that is configured to forward the message comprises:
 looking up in a forwarding information table or in a routing forwarding table according to a destination address of the message, and determine the at least one outbound interface that is configured to forward the message.

3. The method of claim 1, wherein
the selecting one of the determined outbound interfaces as a forwarding outbound interface to forward the message according to the bandwidth usage parameters of the determined outbound interfaces and a content of the message comprises:
 obtaining load sharing weights of the determined outbound interfaces according to the remaining bandwidths of the determined outbound interfaces; and
 selecting one of the determined outbound interfaces as a forwarding outbound interface to forward the message according to the load sharing weights and the content of the message.

4. The method of claim 3, wherein before obtaining load sharing weights of the determined outbound interfaces according to the remaining bandwidths of the determined outbound interfaces, the method further comprising:
 obtaining recorded traffic information of a previous message forwarded by the determined outbound interfaces; and
 the obtaining load sharing weights of the determined outbound interfaces according to the remaining bandwidths of the determined outbound interfaces comprises:
 obtaining load sharing weights of the determined outbound interfaces according to the remaining bandwidths of the determined outbound interfaces and the traffic information of the previous message forwarded by the determined outbound interface.

5. The method of claim 1, wherein before obtaining load sharing weights of the priority queues of the forwarding outbound interface according to the remaining bandwidths of the priority queues of the forwarding outbound interface, the method further comprising:
 obtaining recorded traffic information of a previous message forwarded by the priority queues of the forwarding outbound interface;
 the obtaining load sharing weights of the priority queues of the forwarding outbound interface according to the remaining bandwidths of the priority queues of the forwarding outbound interface comprises:
 obtaining load sharing weights of the priority queues of the forwarding outbound interface, according to the remaining bandwidths of the priority queues of the forwarding outbound interface and the recorded traffic information of the previous message forwarded by the priority queues of the forwarding outbound interface.

6. The method of claim 1, further comprising:
 recording traffic information forwarded by the at least one outbound interfaces and traffic information forwarded by a priority queue corresponding to a priority of the message of the at least one outbound interface.

7. A non-transitory storage medium storing a program that, when executed, cause to perform operations:
 receiving a message and determine at least one outbound interface that is configured to forward the message;
 obtaining bandwidth usage parameters of the outbound interfaces when a number of the outbound interfaces is greater than one; wherein the bandwidth usage parameters comprise remaining bandwidths of the determined outbound interfaces and remaining bandwidths of priority queues of the determined outbound interfaces; and
 when the number of outbound interfaces is greater than one, selecting one of the determined outbound interfaces as a forwarding outbound interface to forward the message, according to the remaining bandwidths of the determined outbound interfaces and a content of the message;
 obtaining load sharing weights of the priority queues of the outbound interfaces according to remaining bandwidths of the outbound interfaces; and
 selecting one of the outbound interfaces as the forwarding outbound interface to forward the message, according to the load sharing weights of the outbound interfaces and the content of the message.

8. The non-transitory storage medium of claim 7, where the operations further comprise:
 receiving the message;
 looking up in a forwarding information table or in a routing forwarding table according to a destination address of the message, and obtaining the at least one outbound interface that is configured to forward the message.

9. The non-transitory storage medium of claim 7, where the operations further comprise:
 obtaining load sharing weights of priority queues of the determined forwarding outbound interface, according to remaining bandwidths of the priority queues of the determined forwarding outbound interface, when the number of outbound interfaces is greater than one; and
 selecting one of the priority queues of the forwarding outbound interface to forward the message, according to the load sharing weights of the priority queues of the determined forwarding outbound interface and the content of the message.

10. The non-transitory storage medium of claim 7, where the operations further comprise:
 recording traffic information of the message forwarded by the at least one outbound interfaces;
 obtaining load sharing weights of the determined outbound interfaces, according to the remaining bandwidths of the determined outbound interfaces and traffic information of a previous message forwarded by the determined outbound interfaces which is recorded.

11. The non-transitory storage medium of claim 9, where the operations further comprise:
 recording traffic information of the message forwarded by the priority queues of the at least one outbound interfaces;
 obtaining the load sharing weights of the priority queues of the forwarding outbound interface, according to the remaining bandwidths of the priority queues of the forwarding outbound interface and the traffic information of the previous message forwarded by the priority queues of the forwarding outbound interface which is recorded.

* * * * *